United States Patent [15] 3,704,448

Osborne [45] Nov. 28, 1972

[54] DATA PROCESSING CONTROL SYSTEM

[72] Inventor: Thomas E. Osborne, San Francisco, Calif.

[73] Assignee: Hewlett-Packard Company, Palo Alto, Calif.

[22] Filed: Aug. 2, 1971

[21] Appl. No.: 168,472

Related U.S. Application Data

[63] Continuation of Ser. No. 769,034, Oct. 21, 1968, abandoned.

[52] U.S. Cl. ............................................... 340/172.5

[51] Int. Cl. ........ G06f 9/20, G06f 13/08, G05b 13/02

[58] Field of Search ................................... 340/172.5

[56] References Cited

UNITED STATES PATENTS

| | | | |
|---|---|---|---|
| 3,440,618 | 4/1969 | Chinlund | 340/172.5 |
| 3,445,818 | 5/1969 | Yen | 340/172.5 |
| 3,559,183 | 1/1971 | Sussenguth | 340/172.5 |
| 3,570,006 | 3/1971 | Hoff et al. | 340/172.5 |
| 3,160,858 | 12/1964 | Adams et al. | 340/172.5 |
| 3,234,519 | 2/1966 | Scholten | 340/172.5 |
| 3,273,126 | 9/1966 | Owen et al. | 340/172.5 |
| 3,309,679 | 3/1967 | Weisberker | 340/172.5 |
| 3,320,594 | 5/1967 | Davies | 340/172.5 |
| 3,325,785 | 6/1967 | Stevens | 340/172.5 |
| 3,380,025 | 4/1968 | Ragland | 340/172.5 |
| 3,388,380 | 6/1968 | Coffin et al. | 340/172.5 |
| 3,389,376 | 6/1968 | Packard | 340/172.5 |
| 3,391,394 | 7/1968 | Ottaway et al. | 340/172.5 |
| 3,397,391 | 8/1968 | Ottaway et al. | 340/172.5 |

*Primary Examiner*—Paul J. Henon
*Assistant Examiner*—Jan E. Rhoads
*Attorney*—Stephen P. Fox

[57] ABSTRACT

A read-only memory includes an instruction section, an address section, and a qualifier section, all of which are addressed simultaneously by a single memory address code and thereafter selectively enabled. A plurality of instructions from the instruction section simultaneously operate on data contained in different storage registers. Qualifier logic compares the data in the storage registers with predetermined conditions addressed in the qualifier section. Different control codes are produced by the qualifier logic and qualifier section of the memory. Main control logic responds to the control codes and gates signals from the instruction and address sections. Instructions from the instruction section may be selectively inhibited.

7 Claims, 8 Drawing Figures

INVENTOR
THOMAS E. OSBORNE

BY *[signature]*

AGENT

INVENTOR

THOMAS E. OSBORNE

BY Stephen P. Fox

AGENT

INVENTOR
THOMAS E. OSBORNE

BY Stephen P. Fox
AGENT

DATA PROCESSING CONTROL SYSTEM

This is a continuation of Ser. No. 769,034, filed Oct. 21, 1968, now abandoned.

BACKGROUND OF THE INVENTION

The data handling capability of a data processing system is generally limited by the storage capacity and the operating speed of the memory unit which contains the data and the processing instructions therefor. One method of increasing the efficiency of the memory unit is by making more effective use of the bits stored in memory. Preferably, such an increase in efficiency serves to reduce the hardware requirements and/or increase the operating speed of the memory unit for a given data processing capability. Alternatively, an increase in the efficiency of the memory unit will expand the data handling capability without requiring additional memory hardware.

SUMMARY OF THE INVENTION

The present invention in the illustrated embodiment provides a data processing system including a read-only memory unit having different sections for storing data processing instructions, memory addresses, and qualifiers representative of predetermined data conditions. These sections are simultaneously interrogated by a single address code. The simultaneous output from the instruction and qualifier sections are separately and selectively gated to control logic circuits which operate on and determine the condition of data contained in storage registers, and the output from the address section is fed back to the read-only memory to select the next addressed locations therein.

One feature of the invention is a main control logic circuit which selectively inhibits the output gates of the instruction section in response to a particular multi-bit control code. The control code is indicative of both the contents of the data registers and predetermined data conditions read out from the qualifier section of the memory unit. The facts that the outputs of the instruction and qualifier sections are simultaneously addressed and that addressed instructions may be enabled or inhibited permits certain portions of a data processing program to be executed in one step rather than two or more steps, and additionally eliminates the need for some instruction address codes. As a result, program execution time is decreased and the number of memory cells for storing the program instructions and corresponding addresses is reduced.

DESCRIPTION OF THE PREFERRED EMBODIMENT

Figure 1:
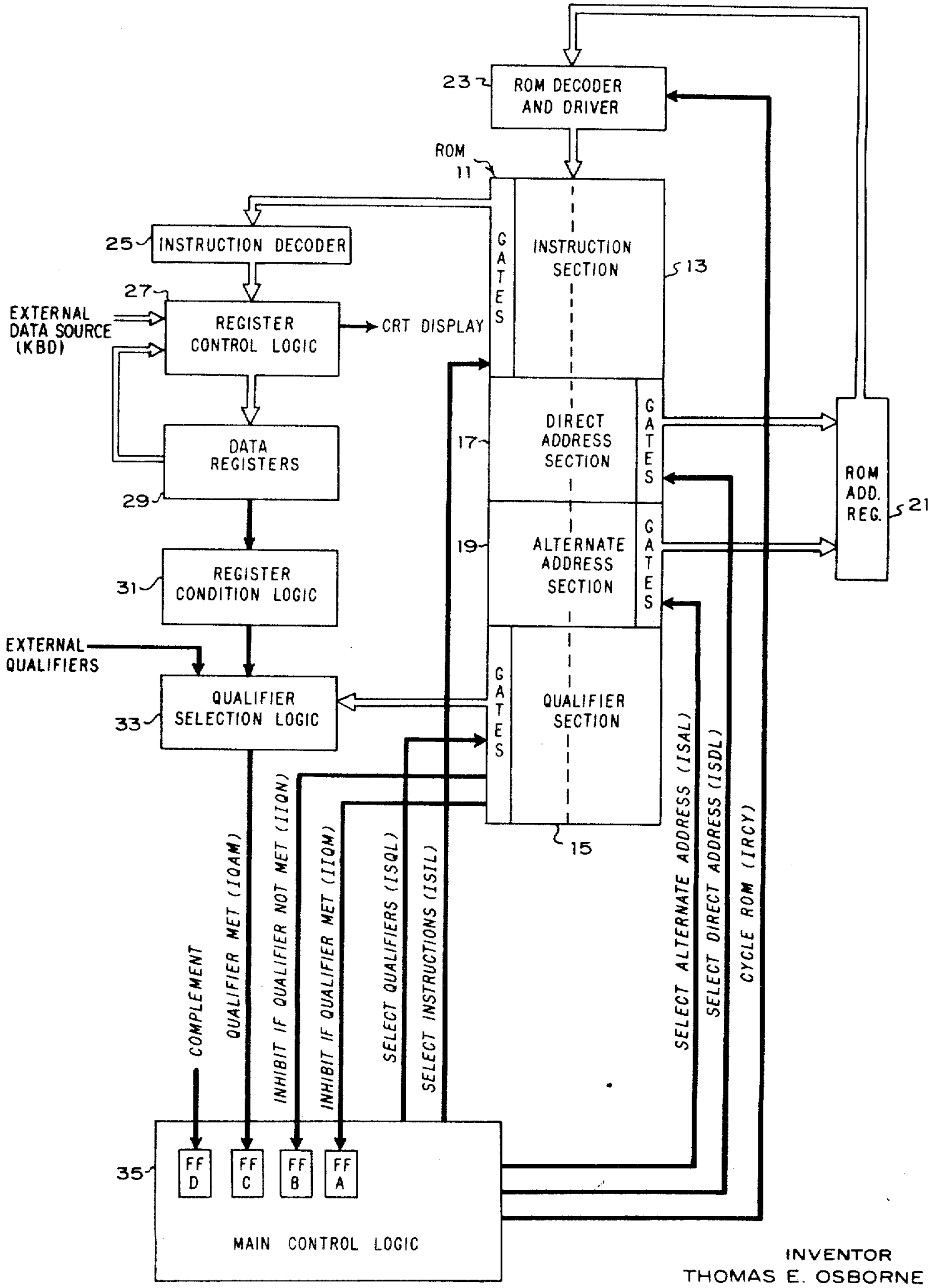
FIG. 1 of the drawings is a block diagram illustrating the preferred embodiment of the data processing system incorporating the present invention.

Referring now to FIG. 1, there is shown a read-only memory unit 11 (ROM) which includes an instruction section 13 for producing data processing instruction signals, a qualifier 15 for producing output signals representative of predetermined data conditions, and an address portion including direct and alternate memory address sections 17, 19. Each memory location in these sections is designated by an address code, and a plurality of memory locations, i.e., one in each section, are simultaneously addressed by a single address code, as indicated by the vertical dashed line running through each section. The combination of addressed locations in the four sections 13, 15, 17, 19 comprise a ROM word. Particular words in the ROM 11 are selected in accordance with an address code which is read out of either one of the address sections 17, 19 and temporarily stored in an address register 21, and thereafter translated into a selection signal for one of the memory lines by a decoder and driver circuit 23. The ROM 11 operates cyclically and progresses from one word to another. The particular address code selected at any one time is fed back to the ROM through the address register 21 and the decoder 23 to define the word to be addressed on the next succeeding cycle. The ROM sections are controlled so that information is gated therefrom at selectively different times, as hereinafter described.

Data processed by the system is in multi-bit binary coded form. Each address location in the ROM 11 contains a multi-bit character. Data signals are of two classes, i.e. operators and operands. Characters stored in the instruction section 13 are operators representing micro-program steps which in combination define routines such as accumulate, multiply, divide and change sign. Each addressed line in the ROM 11 may produce not merely one, but an entire set of data processing instructions from the instruction section 13. These instructions are suitably decoded by an instruction decoding circuit 25 and thereafter applied to control logic circuitry 27 for operating on data which is stored in registers 29. Certain instructions are applied in parallel to different ones of the registers 29 and thus are capable of simultaneous operation of the data therein. As shown in FIG. 1, the register control logic 27 may also receive data signals from an external signal source such as a keyboard. The control logic 27 responds to the micro-program steps from instruction decoder 25 to perform a variety of tasks on data received from the keyboard or other external source and on data in the data registers 29. For example, data from the keyboard may be transferred into data registers 29; data in registers 29 may be transferred from one address location to another; and data representing digits may be shifted, complemented or incremented. In addition, the results of the operations on the data in registers 29 and the data received from external sources may be displayed by a cathode ray tube (CRT) device. A more detailed description of one method in which the instructions may operate on the data is disclosed in copending patent application Ser. No. 559,887, now U.S. Pat. No. 3,556,160.

Typically, the keyboard or other external source provides the data which is entered into registers 29. As the data in registers 29 is manipulated under control of the instruction section 13 and logic circuitry 27, certain predetermined data conditions in the registers, e.g., whether a register contains a particular digit, are sensed by a plurality of gates in the register condition logic circuitry 31 after each set of instructions is executed. Qualifier selection logic circuitry 33 compares the contents of the registers, as indicated by the outputs of the gates in condition logic circuit 31, with data conditions which are determined by the particular bits stored in the memory locations of the qualifier section 15, as well as by bits representative of external qualifiers or data conditions from the keyboard, for example. This comparison is made at the beginning of each cycle of the system clock, before instructions operate on the data. The qualifiers are data bits representing selected conditions which may or may not be met during the processing of data. Examples of qualifiers are whether a digit in a particular address location in the data registers 29 is a selected value, or whether a key on the keyboard is down. Additional qualifiers are described in detail in the aforementioned copending patent application Ser. No. 559,887. The outcome of each comparison operation determines whether the corresponding instructions will be executed and thus determines the internal sequencing of the system, as hereinafter described.

A main control logic circuit 35 receives signals from the qualifier selection logic 33 and from the qualifier section 15 of the ROM and controls the binary bit read out from the different sections of the ROM. More specifically, the control logic 35 includes four flip-flops A, B, C and D, the first three of which are responsive to control signals from the qualifier section 15 and the qualifier selection logic 33, and the fourth of which is responsive to a cyclical complementing signal used for purposes hereinafter described. Flip-flop C is set to a one if a qualifier is met; i.e., if selected bits in the data registers meet certain predetermined conditions which are represented by bits stored in the qualifier section 15. Flip-flop A is set to a one if the particular location addressed in the qualifier section 15 contains a bit which indicates that the signals from the instruction section 13 are to be inhibited if a qualifier is met. Similarly, flip-flop B is set to a one when an addressed bit in the qualifier section indicates that the instruction signals are to be inhibited if the qualifier is not met. The four flip-flops provide a four-digit binary control code which governs operation of the overall system, as herinafter described.

Each section of the ROM 11 includes a plurality of gates for either transmitting or blocking the signals therefrom. The gates for any one section are operated simultaneously under control of the corresponding select signal from the main control logic 35. Also, the main control logic includes an output connected to the decoder and driver circuit 23 for cycling the ROM. In response to this cycling signal, the ROM is interrogated by pulsing one of the addressed lines therein, which in turn produces output signals from each section of the ROM.

Figure 2:
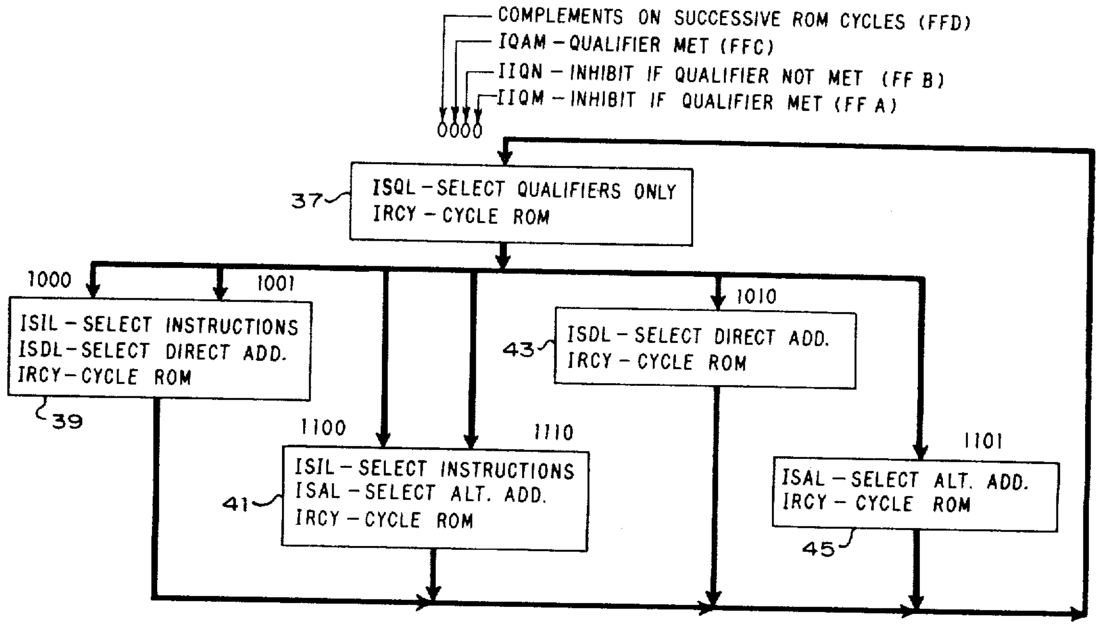
FIG. 2 is a flow diagram illustrating the operation of the main control logic in the system of the invention.

The sequence of operation produced by the main control logic 35 may best be understood by reference to FIG. 2 in conjunction with FIG. 1. The four-digit control code produced by flip-flops A through D governs the combination and sequence of outputs from the ROM as shown in the blocks of FIG. 2. At the beginning of a clock cycle, these four flip-flops are in the clear state (0,0,0,0). The first state of four zeros represents a control code which causes the main control logic 35 to produce control signals for gating, or selecting, the output signals from the qualifier section 15 and for cycling the ROM. These two signals are generated simultaneously and are designated by the four-letter symbols ISQL (select qualifier lines) and IRCY (ROM cycle), respectively, in block 37. These symbols, as well as other four-letter symbols subsequently described, are followed by a statement of function and are used to label the appropriate control lines in FIG. 1. After generation of the control signals in block 37, and at the end of the same clock cycle, flip-flop D is complemented to a one, by circuitry not shown, and flip-flops A, B and C respond to the bits read out from the qualifier section 15 and the qualifier selection logic 33, as described above. At this stage of the operation the four flip-flops may be set in any one of six different states representing codes which cause control to branch to one of four blocks 39, 41, 43 and 45. The four-digit binary codes indicated above these blocks indicate the conditions of the four flip-flops A, B, C and D. As shown, blocks 39 and 41 each are selected by two different states of the flip-flops.

When the control functions of block 39 are addressed by the flip-flops, the main control logic 35 generates three signals which select the instruction section 13 (ISIL), select the direct address section 17 (ISDL), and command the ROM decoder and driver 23 to cycle the ROM 11 (IRCY). Thereafter the flip-flops are cleared and control is transferred back to block 37 and the control sequence is repeated for a new address in the ROM during the next clock cycle. The control functions in block 41 are similar to those of block 39, except that the alternate address section 19 is selected in response to an ISAL signal. In the case where control is transferred from block 37 to block 43 or 45, the control signals generated select one or the other of the direct and alternate address sections 17, 19 (ISDL or ISAL) and cycle the ROM (IRCY), after which control is returned to block 37. It is important to note that in blocks 43, 45 the instruction section 13 is not selected, but instead is inhibited. The fact that the output signals from the instruction section 13 are inhibited during the clock cycle represented by blocks 43, 45, and in the same logic cycle that signals are read out from the qualifier section 15, provides a programming capability which conserves storage positions in the ROM and also reduces the time required for executing a program, as described hereinafter.

It can be seen that blocks 37 through 45 in FIG. 2 form a two-step iterative control loop comprising one logic cycle. During each logic cycle of the system, this control loop is traversed once, and the ROM is cycled twice, i.e. one logic cycle contains two clock cycles.

Figure 3A:
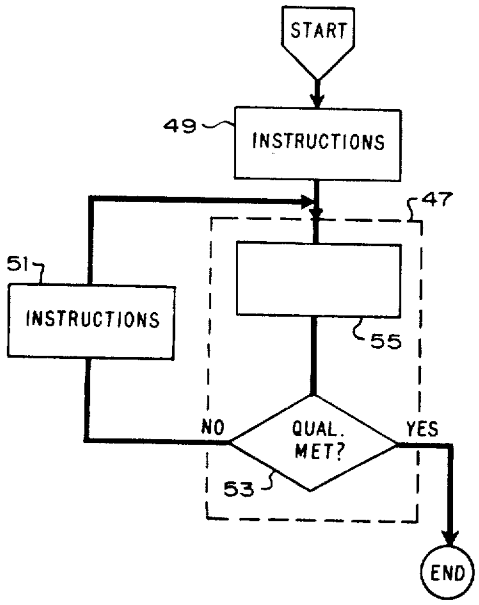
FIGS. 3*a*, *b* are flow diagrams illustrating the data processing capabilies of the system of the invention compared to a prior art system.

The effect and advantages of the main control logic 35 and the iterative control loop sequencing system therefor shown in FIG. 2 will become apparent after first considering the flow diagram of FIG. 3*a*. This flow diagram may be implemented by one type of heretofore known system. In such a system, instructions may be executed individually, or they may be executed during the same logic cycle as a qualifier decision. In FIG. 3*a*, the functions performed during the same logic cycle are those inside the dashed-line rectangle 47, and the instructions performed individually are represented by blocks 49, 51, each of which requires one logic cycle for execution. The instructions 51 are in an iterative loop and are executed repeatedly as long as the qualifier (i.e., the data condition) represented by block 53 is not met. However, it is important to note that if the qualifier 53 is met, then instructions 51 are not executed. Proper timing for assuring that the instructions are not executed is provided by a bank address location in memory as represented by the empty block 55, which consumes one clock cycle. Thus, it can be seen that the execution of qualifier 53 and instructions 51 requires two logic cycles of two steps each, and the execution of qualifier 53 by itself requires one two-step logic cycle along with a blank address location in memory.

Figure 3B:
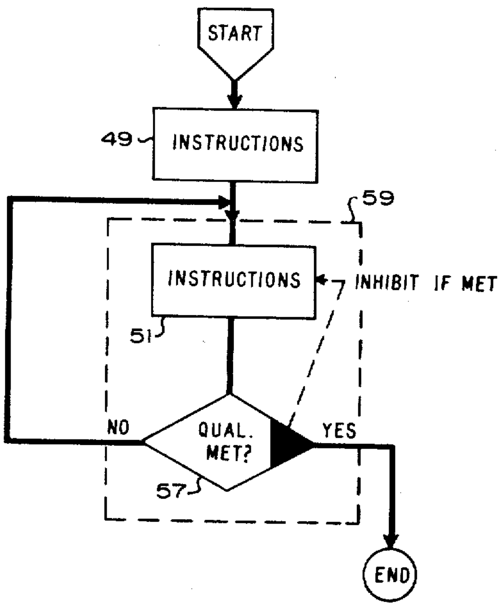

The flow chart of FIG. **3*b* performs functions identical to those of FIG. 3*a*, and illustrates how the instruction inhibiting feature of the present invention provides a more efficient programming capability. The inhibit feature is represented in FIG. 3*b* by the notation of a shaded right-hand portion of the qualifier decision block 57 and the dashed-line arrow extending therefrom back to instruction block 51, the latter of which corresponds to the instructions 51 shown in FIG. 3*a*. Because of the inhibit feature, the instructions 51 are included inside the dashed-line rectangle 59 and are repeatedly executed with the qualifier decision 57 in the same two-step logic cycle, except when the qualifier is met, in which case the instructions 51 are not executed in the second step of the logic cycle. More specifically, a single address line selects a ROM word comprising a qualifier, one or more instructions, and one of the output lines IIQN and IIQM, the latter of which indicates whether or not the addressed instructions are to be inhibited. If instructions are to be inhibited, the main control logic 35 provides an ISIL signal which disables the gates at the output of the instruction section 13. The inhibiting operation occurs in the same logic cycle that the qualifier decision is made, and both the qualifiers and the inhibited instructions are in the same ROM word. The read-out of instructions may be inhibited for a variety of reasons, for example in the case where the qualifier decision indicates that a repetitive digit-decrementing or bit-shifting operation in a data register is completed and another operation is to begin. According to the flow chart illustration of FIG. 3*b*, the qualifier decision 57 is made first and thereafter the instructions 51 are either enabled or inhibited. The increased programming efficiency provided by the inhibiting feature is apparent from the fact that the iterative loop in FIG. 3*b* requires one less instruction coding address and half the execution time (i.e. one logic cycle instead of two) than the iteration loop of FIG. 3*a***.

FIGS **4*a*–*d* provide more detailed flow chart illustrations of the various programming capabilities which are possible in operation of the main control logic 35. In each of these figures, the letters DA and AA above the rectangular blocks indicate that the instructions represented by the corresponding block are addressed respectively by the direct address section 17 or the alternate address section 19 of the ROM 11. Also, the four-digit binary code designations which reference certain ones of the arrows between the rectangular instruction blocks and the diamond-shaped decision blocks are the codes corresponding to the states of the flip-flops A, B, C and D which cause control to branch to one of the blocks 39, 41, 43 and 45 shown in FIG. 2**.

Figure 4A:
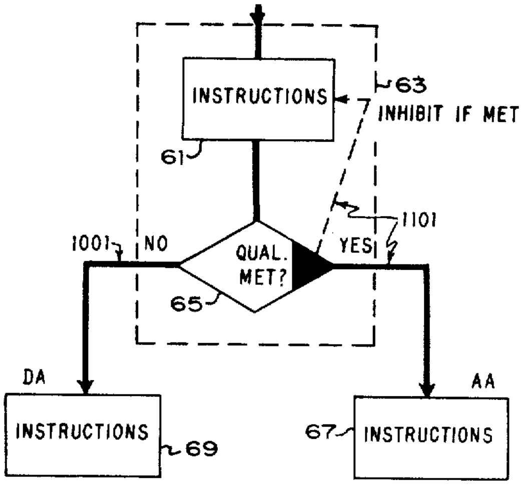
FIGS. 4*a–d* are flow diagrams illustrating the various programming capabilities of the system of the present invention.
Figure 4B:
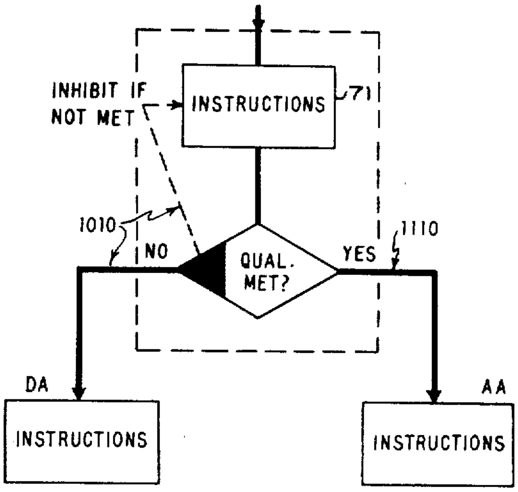

Referring now to FIG. **4*a*, a plurality of instructions in a set represented by block 61 are stored in the ROM 11 (FIG. 1) and are addressed by the ROM address register 21 with either a direct address (DA) or an alternate address (AA) obtained from one of the sections 17, 19 (FIG. 1). As noted hereinabove, these instructions may be read out of the ROM simultaneously with signals from the qualifier section 15, as indicated by the dashed-line rectangle 63. The qualifier signals enable a decision to be made with respect to selected contents of the data registers, as indicated by the decision block 65. If a "qualifier met" signal IQAM is produced by the qualifier selection logic 33, and if an "inhibit if qualifier met" signal IIQM signal is also read out of the qualifier section 15, then the four-digit binary code becomes 1101 so that control branches to block 45 (FIG. 2) and the set of instructions represented by block 61 is inhibited rather than being read out of the ROM. As described hereinabove with respect to FIG. 3*b*, this inhibiting feature is represented by the right-hand shaded portion of the block 65 and the arrow extending therefrom back to the instruction block 61. It is to be noted that the instructions are either inhibited or performed during the same logic cycle that the qualifier decision is made. If the qualifier is met, the next set of instructions selected are represented by block 67 and are selected by an address obtained from the alternate address (AA) section of the ROM. However, if the qualifier is not met, the binary code becomes 1001, control branches to block 39 (FIG. 2), and the next set of instructions executed are those of block 69 (FIG. 4*a***) which are selected by an address obtained from the direct address (DA) section of the ROM.

The flow diagram of FIG. **4*b* is similar to that of 4*a* except that a set of instructions represented by block 71 is inhibited if selected qualifiers are not met. In this case the four flip-flops A through D produce the binary code 1010 and the system control branches to block 43 during the second step of the iterative control loop shown in FIG. 2. In the case where the qualifier is met, the control code is 1110 and control branches to block 41 of FIG. 2**.

Figure 4C:
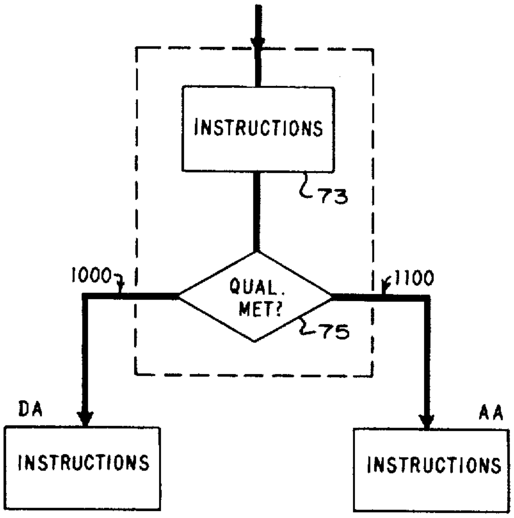
Figure 4D:
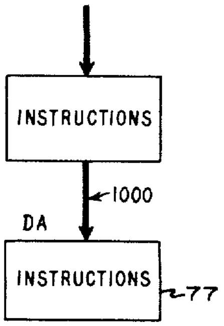

FIGS. **4*c*, *d* illustrate flow diagrams wherein the addressed sets of instructions are not inhibited. In FIG. 4*c*, the instructions 73 and qualifier decision 75 are executed during one logic cycle and the system branches to either block 39 or block 41 of FIG. 2, under control of the flip-flop binary codes 1000 or 1100, respectively, depending on whether or not the qualifier represented by decision block 75 is met. In FIG. 4*d*, the sets of instructions 77 are executed under control of the code 1000 which activates the signals in block 39 of FIG. 2**.

I claim:

1. A data processing system comprising:
   - data register means for containing data to be processed;
   - register control logic means for operating on data contained within said data register means;
   - an addressable memory unit including:
     - an instruction section having a plurality of outputs for causing different operations to occur in said data registers;

a qualifier section having a plurality of condition outputs defining predetermined testable data conditions within said data register means, said qualifier section also having an inhibit signal output representing that instructions are not to be read out from said instruction section;

means for gating the outputs from said instruction section to said register control logic means, said gating means having a gate control input;

register condition logic for providing outputs indicating conditions existing within said data register means;

comparison means for comparing the outputs from said qualifier section and said register condition logic and for generating a qualifier signal indicating when a predetermined relationship exists between said last named outputs; and control logic means having an output coupled to the gate control input of said gating means for operating said gating means to inhibit the readout of instructions from said instruction section to said register control logic in response to concurrence of the qualifier signal from said comparison means and the inhibit signal from said qualifier section.

2. The system of claim 1, said memory unit further including:

an address portion for providing address signals, said address portion including means for selectively gating signals therefrom.

3. The system of claim 2, said address portion including a direct address section and an alternate address section, said direct and alternate address sections being separately selectable by the gating means of said address portion.

4. The system of claim 3, said control logic means being operable in an iterative control loop having first and second steps of operation, said control logic means including:

means operable during said first step for enabling said qualifier section and for cycling said memory unit to read out of said memory unit the addressed qualifier signals;

means operable during said second step and simultaneously with said means for gating the output signals from said instruction section to said register control logic means for enabling the gating means of either the direct or alternate address sections of said address portion and for cycling said memory unit to select the next location in said memory unit which is addressed by said address portion.

5. A data processing system comprising:

a cyclically operable addressable memory unit including:

an instruction section for producing data processing instruction signals;

a qualifier section for producing qualifier signals representative of predetermined data conditions, and first and second inhibit signals for indicating that said instruction signals are to be inhibited if said predetermined data conditions are met and not met, respectively;

an address portion for providing address signals to direct selection of data bits from said memory unit;

each of said instruction section, said qualifier section and said address portion including gating means for selecting signals therefrom;

a plurality of registers for containing data to be processed;

logic means for operating on the data in said registers in response to said instruction signals;

means for indicating predetermined conditions of the contents of selected ones of said registers;

comparing means responsive to selected qualifier signals and said indicating means for providing an output signal having first and second states for indicating that the predetermined data conditions represented by said selected qualifier signals are met and not met, respectively; and control logic means for selectively enabling the gating means of said instruction section, said qualifier section and said address portion and for cycling said memory unit, said control logic means including means for inhibiting the readout of instruction signals in response to the concurrence of said first inhibit signal and said first state of said output signal, and in response to the concurrence of said second inhibit signal and said second state of said output signal during a time interval when said last named instruction signals are addressed by the same address as said selected qualifier signals applied to said comparing means.

6. The system of claim 2, said memory unit further including means responsive to an address signal from said address portion for simultaneously addressing predetermined memory locations in said instruction section, said qualifier section and said address portion.

7. The system of claim 5, further including means responsive to a single address signal from said address portion for simultaneously addressing predetermined memory locations in said instruction section, said qualifier section and said address portion.

* * * * *

UNITED STATES PATENT OFFICE

CERTIFICATE OF CORRECTION

Patent No. 3,704,448 Dated November 28, 1972

Inventor(s) Thomas E. Osborne

It is certified that error appears in the above-identified patent and that said Letters Patent are hereby corrected as shown below:

Column 2, line 62, "3,556,160" should read --3,566,160--.

Signed and sealed this 24th day of April 1973.

(SEAL)
Attest:

EDWARD M. FLETCHER, JR.
Attesting Officer

ROBERT GOTTSCHALK
Commissioner of Patents

FORM PO-1050 (10-69)
60010

USCOMM-DC 60376-P69
★ U.S. GOVERNMENT PRINTING OFFICE : 1969 O—366-334